(12) United States Patent
Ganesan et al.

(10) Patent No.: US 12,739,099 B2
(45) Date of Patent: Sep. 15, 2026

(54) VERIFIABLE KEY EXCHANGE FOR CRYPTOGRAPHY

(71) Applicant: Oracle International Corporation, Redwood Shores, CA (US)

(72) Inventors: Dharmalingam Ganesan, Crofton, MD (US); David M. Clifton, Ellicott City, MD (US)

(73) Assignee: Oracle International Corporation, Redwood Shores, CA (US)

( * ) Notice: Subject to any disclaimer, the term of this patent is extended or adjusted under 35 U.S.C. 154(b) by 161 days.

(21) Appl. No.: 18/778,025

(22) Filed: Jul. 19, 2024

(65) Prior Publication Data

US 2026/0025260 A1 Jan. 22, 2026

(51) Int. Cl.

| | |
|---|---|
| ***H04L 29/06*** | (2006.01) |
| ***G06F 21/00*** | (2013.01) |
| ***H04L 9/08*** | (2006.01) |
| ***H04L 9/30*** | (2006.01) |

(52) U.S. Cl.

CPC .......... *H04L 9/0819* (2013.01); *H04L 9/0869* (2013.01); *H04L 9/3013* (2013.01)

(58) Field of Classification Search

None

See application file for complete search history.

(56) References Cited

U.S. PATENT DOCUMENTS

| | | | | |
|---|---|---|---|---|
| 6,122,742 | A * | 9/2000 | Young | H04L 9/0894 380/278 |
| 12,542,658 | B2 * | 2/2026 | Pettit | H04L 9/085 |
| 2019/0019366 | A1 * | 1/2019 | Chepel | H04L 9/3255 |
| 2021/0167958 | A1 * | 6/2021 | Soriente | H04L 63/0442 |

(Continued)

FOREIGN PATENT DOCUMENTS

| | | | | | |
|---|---|---|---|---|---|
| CN | 102625939 | B | * | 2/2017 | G06Q 10/06 |
| CN | 105553966 | B | * | 11/2018 | H04L 63/061 |
| CN | 118159967 | A | * | 6/2024 | G06F 21/53 |

(Continued)

OTHER PUBLICATIONS

Diffie et al., "New Directions in Cryptography", IEEE Transactions On Information Theory, vol. IT-22, No. 6, pp. 644-654, Nov. 1976.

(Continued)

*Primary Examiner* — Lisa C Lewis

(74) *Attorney, Agent, or Firm* — Potomac Law Group, PLLC

(57) ABSTRACT

Embodiments establish, at a first entity, a common secret key ("k") for encrypted data communication during a key exchange between the first entity and a second entity. Embodiments select a first private key of the first entity and receive, from the second entity, a second public key ("A") of the second entity. Embodiments receive from the second entity a first verification value ("C"). Embodiments generate a first random number ("e") and send e to the second entity and receive from the second entity a second verification value ("D") in response to the first random number, where D, when properly generated, is based at least on r, e and the second private key. Embodiments determine, based on C and D, whether A is properly generated and when A is not properly generated, end the key exchange.

20 Claims, 8 Drawing Sheets

(56) References Cited

U.S. PATENT DOCUMENTS

| | | | | |
|---|---|---|---|---|
| 2024/0031137 | A1 | 1/2024 | Nix | |
| 2025/0182109 | A1 * | 6/2025 | Boyraz | G06Q 20/401 |

FOREIGN PATENT DOCUMENTS

| | | | | | |
|---|---|---|---|---|---|
| CN | 118694516 | A | * | 9/2024 | H04L 9/0891 |
| JP | 2024055092 | A | * | 4/2024 | H04L 41/0886 |

OTHER PUBLICATIONS

Pfeiffer et al., "D(HE)at: A Practical Denial-of-Service Attack on the Finite Field Diffie-Hellman Key Exchange:", IEEE Access Research Article, Digital Object Identifier 10. 1109, pp. 957-980, Dec. 2023.

* cited by examiner

VERIFIABLE KEY EXCHANGE FOR CRYPTOGRAPHY

FIELD

One embodiment is directed generally to a cryptography, and in particular to a key exchange for the use of cryptography.

BACKGROUND INFORMATION

Cryptography is the practice and study of techniques for securing communication and data from adversaries. It involves various methods for encoding information in such a way that only authorized parties can decipher it. There are two main types of cryptography: symmetric-key cryptography and public-key cryptography.

In symmetric-key cryptography, the same key is used for both encryption and decryption. This means that both the sender and the receiver must have the same secret key. The challenge with symmetric-key cryptography lies in securely exchanging the key between the communicating parties. Once the key is exchanged securely, symmetric encryption is usually faster and more efficient than public-key cryptography.

Public-key cryptography, also known as asymmetric cryptography, uses a pair of keys: a public key and a private key. The public key is used for encryption, while the private key is used for decryption. The keys are mathematically related, but it is computationally infeasible to derive the private key from the public key. This enables secure communication without the need for both parties to exchange a secret key beforehand. Public-key cryptography is widely used in various applications, including secure communication over the internet, digital signatures, and encryption of stored data.

Key exchange is the process of securely sharing cryptographic keys between parties to enable encrypted communication. It is crucial for ensuring the confidentiality and integrity of data exchanged between parties.

SUMMARY

Embodiments establish, at a first entity, a common secret key ("k") for encrypted data communication during a key exchange between the first entity and a second entity. Embodiments select a first private key of the first entity and receive, from the second entity, a second public key ("A") of the second entity, where the second public key, when properly generated, is based at least on a second private key of the second entity. Embodiments receive from the second entity a first verification value ("C"), where C, when properly generated, is based at least on a second random number ("r") selected by the second entity. Embodiments generate a first random number ("e") and send e to the second entity and receive from the second entity a second verification value ("D") in response to the first random number, where D, when properly generated, is based at least on r, e and the second private key. Embodiments determine, based on C and D, whether A is properly generated and when A is not properly generated, end the key exchange.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Further, elements may not be drawn to scale.

DETAILED DESCRIPTION

One embodiment provides key verification during a cryptography public key exchange so that each communicating party can check the integrity of the public key from the other party before arriving at a common secret key. As a result, attacks on the public key exchange, such as denial of service ("DOS") attacks, can be prevented.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
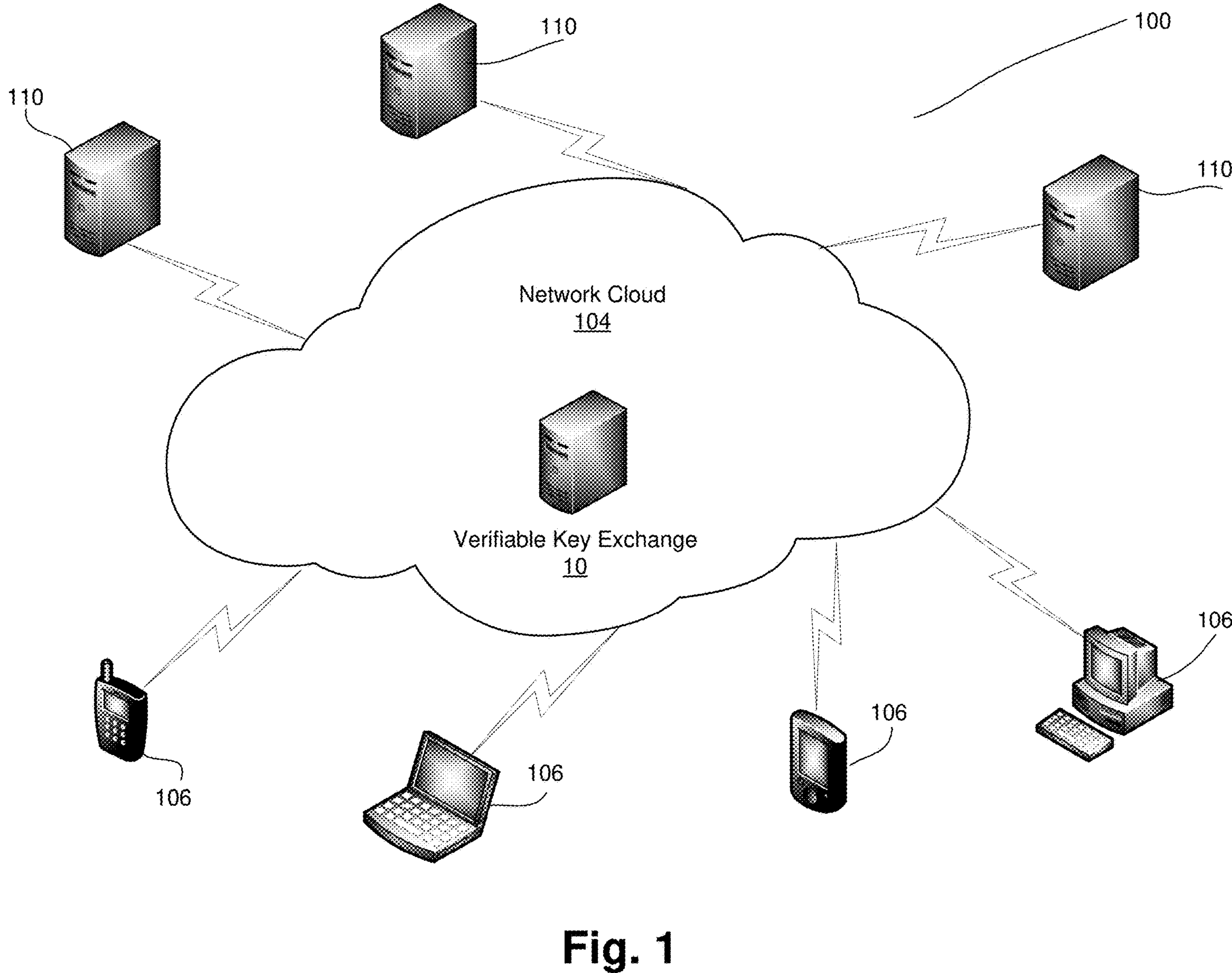
FIG. 1 illustrates an example of a system that includes a verifiable key exchange system in accordance to embodiments.

FIG. 1 illustrates an example of a system 100 that includes a verifiable key exchange system 10 in accordance to embodiments. Verifiable key exchange system 10 may be implemented within a computing environment that includes a communication network/cloud 104 and is part of a system 10 that implements an application that requires encryption for data exchange. Network 104 may be a private network that can communicate with a public network (e.g., the Internet) to access additional services 110 (i.e., cloud based applications) provided by a cloud services provider (i.e., a cloud infrastructure). Examples of communication networks include a mobile network, a wireless network, a cellular network, a local area network ("LAN"), a wide area network ("WAN"), other wireless communication networks, or combinations of these and other networks. Verifiable key exchange system 10 may be administered by a service provider, such as via the Oracle Cloud Infrastructure ("OCI") from Oracle Corp.

Tenants of the cloud services provider can be organizations or groups whose members include users of services offered by the service provider. Services may include or be provided as access to, without limitation, an application, a resource, a file, a document, data, media, or combinations thereof. Users may have individual accounts with the service provider and organizations may have enterprise accounts with the service provider, where an enterprise account encompasses or aggregates a number of individual user accounts.

System 100 further includes client devices 106, which can be any type of device that can access network 104 and can obtain the benefits of the functionality of verifiable key exchange system 10 of providing and accepting encrypted data that requires a private key to decrypt in order to use the application or applications implemented by system 10. In embodiments, client devices 106 also implement the disclosed key exchange technique when transferring and receiving encrypted data. As disclosed herein, a "client" (also disclosed as a "client system" or a "client device") may be a device or an application executing on a device. System 100 includes a number of different types of client devices 106 that each is able to communicate with network 104.

Figure 2:
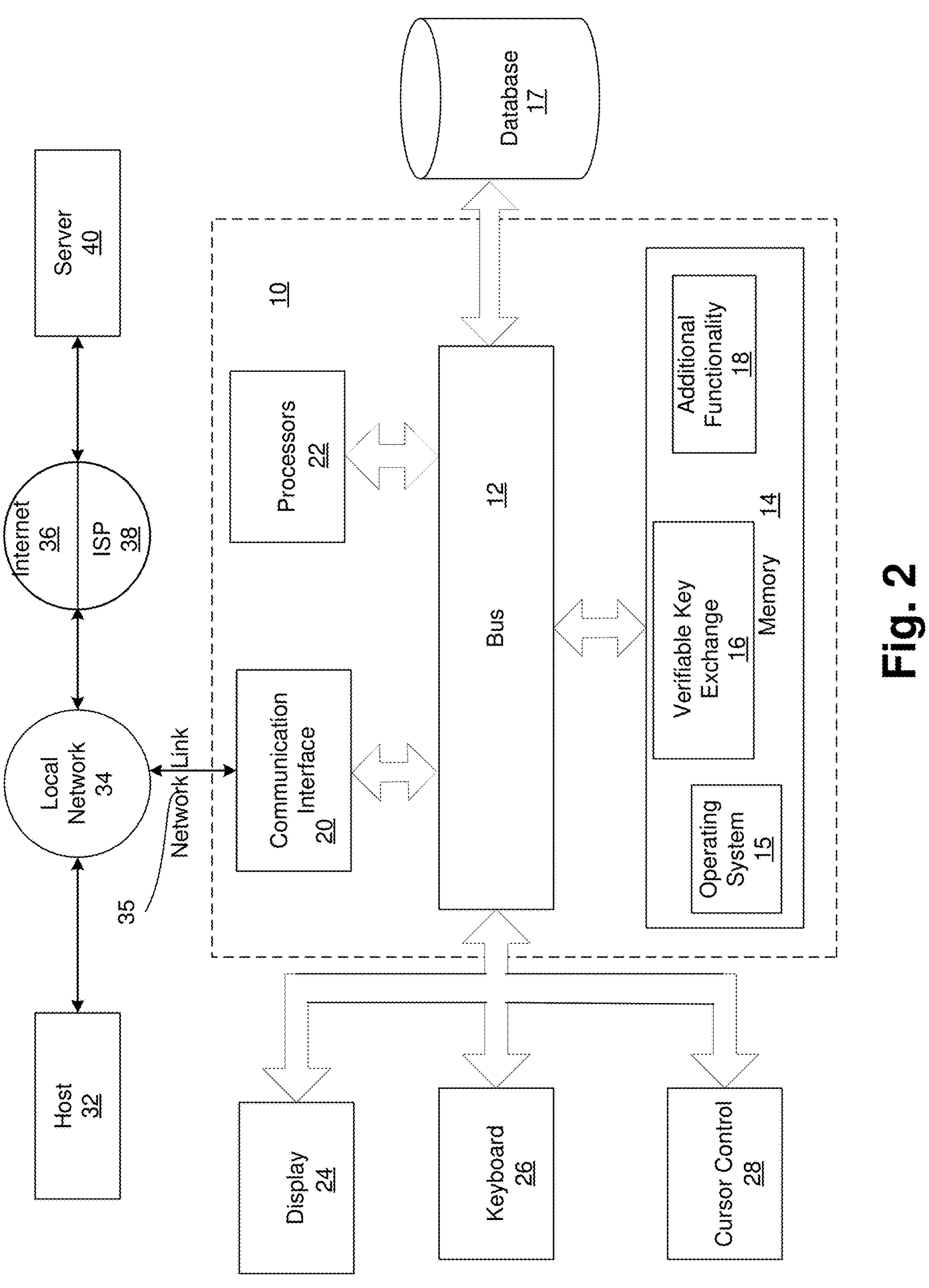
FIG. 2 is a block diagram of a computer server/system in accordance with an embodiment of the present invention that can be used to implement any of the functionality disclosed herein.

FIG. 2 is a block diagram of a computer server/system 10 in accordance with an embodiment of the present invention that can be used to implement any of the functionality disclosed herein. Although shown as a single system, the functionality of system 10 can be implemented as a distributed system. Further, the functionality disclosed herein can be implemented on separate servers or devices that may be coupled together over a network. Further, one or more components of system 10 may not be included. One or more components of FIG. 2 can also be used to implement any of the elements of FIG. 1.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication interface 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a verifiable key exchange module 16 that provides a verifiable key exchange between system 10 and all clients/devices communicating with system 10 using encrypted data, and all other functionality disclosed herein. System 10 can be part of a larger system. Therefore, system 10 can include one or more additional functional modules 18 to include the additional functionality that uses encrypted data, such as a business intelligence application, inventory management application, retail/hotel management application, etc. A file storage device or database 17 is coupled to bus 12 to provide centralized storage for modules 16 and 18, including public and private encryption keys. In one embodiment, database 17 is a relational database management system ("RDBMS") that can use Structured Query Language ("SQL") to manage the stored data.

In embodiments, communication interface 20 provides a two-way data communication coupling to a network link 35 that is connected to a local network 34. For example, communication interface 20 may be an integrated services digital network ("ISDN") card, cable modem, satellite modem, or a modem to provide a data communication connection to a corresponding type of telephone line or Ethernet. As another example, communication interface 20 may be a local area network ("LAN") card to provide a data communication connection to a compatible LAN. Wireless links may also be implemented. In any such implementation, communication interface 20 sends and receives electrical, electromagnetic or optical signals that carry digital data streams representing various types of information.

Network link 35 typically provides data communication through one or more networks to other data devices. For example, network link 35 may provide a connection through local network 34 to a host computer 32 or to data equipment operated by an Internet Service Provider ("ISP") 38. ISP 38 in turn provides data communication services through the Internet 36. Local network 34 and Internet 36 both use electrical, electromagnetic or optical signals that carry digital data streams. The signals through the various networks and the signals on network link 35 and through communication interface 20, which carry the digital data to and from computer system 800, are example forms of transmission media.

System 10 can send messages and receive data, including program code, through the network(s), network link 35 and communication interface 20. In the Internet example, a server 40 might transmit a requested code for an application program through Internet 36, ISP 38, local network 34 and communication interface 20. The received code may be executed by processor 22 as it is received, and/or stored in database 17, or other non-volatile storage for later execution.

In one embodiment, system 10 is a computing/data processing system including an application or collection of distributed applications for enterprise organizations, and may also implement logistics, manufacturing, and inventory management functionality. The applications and computing system 10 may be configured to operate locally or be implemented as a cloud-based networking system, for example in an infrastructure-as-a-service ("IAAS"), platform-as-a-service ("PAAS"), software-as-a-service ("SAAS") architecture, or other type of computing solution.

DH Key Exchange Algorithm

As disclosed, public-key cryptography uses both a public key and a private/secret key. For two parties to communicate securely over an insecure channel, they both must agree on the common secret key "k" that can be used for encryption and decryption. The Diffie-Hellman ("DH") key exchange algorithm solved this fundamental key agreement problem, without any previous arrangements (e.g., courier service). The DH key exchange is commonly found in security protocols, such as Transport Layer Security ("TLS"), Secure Shell ("SSH") and IP Security ("IPsec"). For example, in IPsec, the encryption method is used for key generation and key rotation.

The DH algorithm is defined using a one-way function, formalized below.

Specifically:

Let p be a prime number, and let $Z'_p=\{1, 2, 3, \ldots, p-1\}$.

One of the fundamental results in number theory is that $Z'_p$ contains a special element called generator g. For example, let p=11; Z*p={1, 2, 3, 4, 5, 6, 7, 8, 9, 10}. In Z*11, 2 is a generator because all elements of Z*11 can be represented as $2^i$ in mod p, for some integer i.

Z*p is a cyclic group because Z*p contains a generator. The DH key exchange algorithm is defined in a cyclic group such as Z*p.

An example of the DH key exchange algorithm is as follows: Alice and Bob are two parties who want to agree on a common secret key k that is used both for encryption and decryption. "Alice" and "Bob" can be considered two computer applications that are connected by a computer network, and at least one of the computer applications may be executed on a cloud infrastructure, such as on cloud 104 using system/server 10 of FIG. 1. The goal of the DH key exchange is to establish the shared secret key k which can be used by them to encrypt and decrypt messages. Both parties/entities have to publicly agree on positive whole numbers p and g. In embodiments, p and g are integers where p is prime, and g is a primitive root modulo p, (i.e., g is a generator of p) and can be defined by the U.S. National Institute of Standards and Technology ("NIST") or by other sources. The generator g is a number that, when raised to positive whole-number powers less than p, never produces the same result for any two such whole numbers. The value of p may be large, but the value of g is usually small. The following known steps implement the DH key exchange algorithm:

Step 1: Alice randomly picks a positive whole number integer, private key x in (1, p). Similarly, Bob randomly picks a private key y in (1, p);

Step 2: Alice sends $A=g^x \pmod p$ to Bob;

Step 3: Bob sends $B=g^y \pmod p$ to Alice;

Step 4: Alice computes $B^x$ and Bob computes $A^y$. Because $B^x=A^y=g^{xy}$, they both have the same key $k=g^{xy}$.

Step 2 and Step 3 can be performed in parallel since they are independent of inputs from other parties. The private keys (x and y) are never exchanged over the public channel. Further, no party knows the private key of the other party.

The DH key exchange algorithm's security is based on the assumption that (1) given public values $g^x$, $g^y$, it is difficult to find $g^{xy}$; or (2) given the public values $g^x$ (or $g^y$), it is difficult to find x (or y); this problem is called the discrete log problem, and is considered to be a computational hard problem.

However, there is a fundamental problem in step 4 of the DH key exchange algorithm described above, which is that each side is trusting the public value (i.e., A and B) sent by the other side. If Alice is a malicious client, it can attack Bob by sending a random value for A, instead of the calculated value of A (i.e., $g^x \pmod p$)). This will force Bob to perform all the necessary computational steps, and then request that Alice resend "A", because the calculations will not work as assumed. Similarly, a malicious Bob can also attack Alice by sending a random value for B. This attack, referred to as a "D(HE) at" attack, allows a malicious client, such as Alice, to create a denial of service ("DOS") attack on Bob, the victim server, because Bob will be "tricked" into continuously forming computational steps, thereby targeting the finite field DH key exchange protocol.

Figure 3:
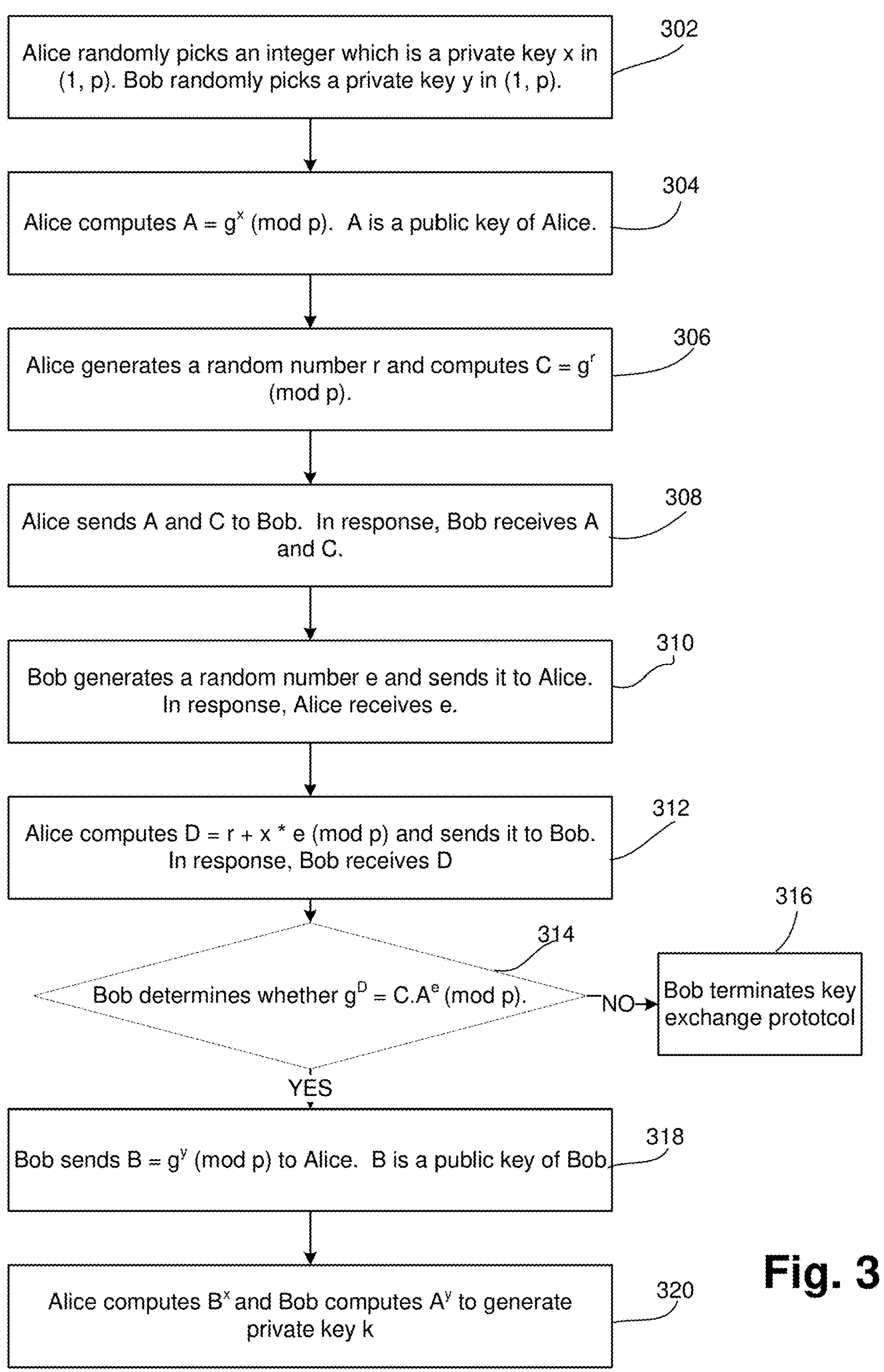
FIG. 3 is a flow diagram of the functionality of the verifiable key exchange system of FIG. 1 and a client when performing a secure key exchange in accordance to embodiments.

In order to prevent this type of DOS attack using a secure key exchange, embodiments extend the DH key exchange algorithm, and other key exchanges as disclosed below, by enabling both parties to verify the public key they receive from the other side. FIG. 3 is a flow diagram of the functionality of verifiable key exchange system 10 of FIG. 1 (referred to as "Bob") and a client 106 (referred to as "Alice") when performing a secure key exchange in accordance to embodiments. In one embodiment, the functionality of the flow diagram of FIG. 3 (and FIG. 4 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, Alice randomly picks an integer which is a private key x in (1, p). Similarly, Bob randomly picks a private key y in (1, p), where p is a publicly agreed to prime number.

At 304, Alice computes $A=g^x \pmod p$, where g is a generator of p. A is a public key of Alice. Therefore, when properly generated (i.e., Alice follows the specified key exchange algorithm), A is based at least on x.

At 306, Alice generates a random number r and computes $C=g^r \pmod p$. Therefore, when properly generated, C is based at least on r.

At 308, Alice sends A and C to Bob. In response, Bob receives A and C.

At 310, Bob generates a random number e and sends it to Alice. In response, Alice receives e.

At 312, Alice computes $D=r+x*e \pmod p$ and sends it to Bob. In response, Bob receives D. Therefore, when properly generated, D is based at least on r, x and e. Note that Bob cannot recover r or x from D.

At 314, Bob determines whether $g^D=C\cdot A^e \pmod p$. "·" is a scalar multiplication of two integers. If they are equal, Alice's public key A is trustable (i.e., generated properly) because if Alice does not know the private key x, it would be computationally expensive to generate a valid A. If they are not equal, Bob at 316 terminates the key exchange protocol, and may terminate any communication with Alice, as it is suspected that Alice is initiating an attack since A was not generated properly.

At 318, Bob sends $B=g^y \pmod p$ to Alice. B is a public key of Bob.

At 320, Alice computes $B^x$ and Bob computes $A^y$. Because $B^x=A^y=g^{xy}$, they both now have the same private key $k=g^{xy}$.

In embodiments, the functionality of 306-314 verify the integrity of the public key A that Alice sends to Bob. This functionality use a zero-knowledge verification paradigm because it allows for Alice to demonstrate that she has a valid private key, without revealing it. Note that these steps can be controlled by a configuration parameter to enable (or disable) the integrity check functionality. The rest of the functionality is the same as in the original DH key exchange algorithm. All communication between Alice and Bob are happening over a public channel in embodiments.

The functionality of 304-308 can be combined by Alice, who needs to send both A and C. Similarly, 310 can be performed by Bob before 302-308.

As disclosed, the functionality of 306-314 checks the integrity of the public key A received from Alice. Due to the symmetry of the key exchange algorithm, Alice can also verify the integrity of the public key received from Bob. Embodiments defeat the denial-of-service attack disclosed above because each party can verify the integrity of the public key from the other party.

Elgamal Encryption Algorithm

The "Elgamal encryption" algorithm can be viewed as an extension of the DH key exchange algorithm. After both Alice and Bob arrive at a secret key k using the DH algorithm, they can use that key for encryption and decryption. The Elgamal encryption algorithm's core idea is that Alice uses this key k as a mask to encrypt a secret message i as j=i*k (mod p). Alice sends j to Bob. Since Bob knows the secret key k, the message i can be recovered using j*k−1 (mod p), where k−1 is the multiplicative inverse of k.

Because the Elgamal encryption algorithm uses the DH key exchange algorithm to arrive at the same key k, the same denial of service attack disclosed above can also be performed on the Elgamal encryption algorithm. Therefore, embodiments can use the functionality of 306-314 with the Elgamal encryption algorithm so that Bob can verify whether Alice generated her public key properly.

Elliptic Curve DH

Elliptic Curve DH ("ECDH") is supported by protocols such as TLS, SSH, etc., and is several orders of magnitude faster than the DH algorithm in Z*p. ECDH is a variant of DH but uses the same fundamental structure to establish a secret key k between Alice and Bob. The ECDH domain parameters are as follows:

1. Choose a prime p and the elliptic curve E: $y^2=x^3+a*x+b$ (mod p);
2. Choose a primate element P=(x, y) which generates all elements of the above curve E. Usually P and E are defined by NIST or equivalent standards and are publicly agreed to.

The prime p, the curve given by its coefficients a, b, and the primitive element P are the domain parameters that both Alice and Bob agree to use. The domain parameters are assumed to be public.

The following known steps implement ECDH:

Step 1: Alice chooses a private key a which is an integer in [2, #E-1], where #E denotes the number of points on the elliptic curve E. Similarly, Bob chooses a private key b;

Step 2: Alice generates her public key A=a*P. Note that "*" is a special multiplication operator defined on the elliptic curve. Alice sends her public key A to Bob. This means A is a point on the elliptic curve;

Step 3: Bob generates his public key B=b*P. The "*" has the same meaning as defined in step 2. Bob sends his public key B to Alice. This step can be performed in parallel to step 2;

Step 4: Alice commutes the shared secret k=a*B. This means the secret key k is a point on the elliptic curve. Similarly, Bob comments the same secret k=b*A. Note a*B=b*A.

The D(HE) at attack disclosed above is also applicable to ECDH, but the performance impact may not be as critical because ECDH operations are several orders of magnitude faster than the traditional DH algorithm. Regardless, embodiments of the invention can be used in conjunction with ECHD to reduce the risk due to D(HE) by allowing Bob to verify whether Alice properly generated her public and private key pair, and vice versa.

Figure 4:
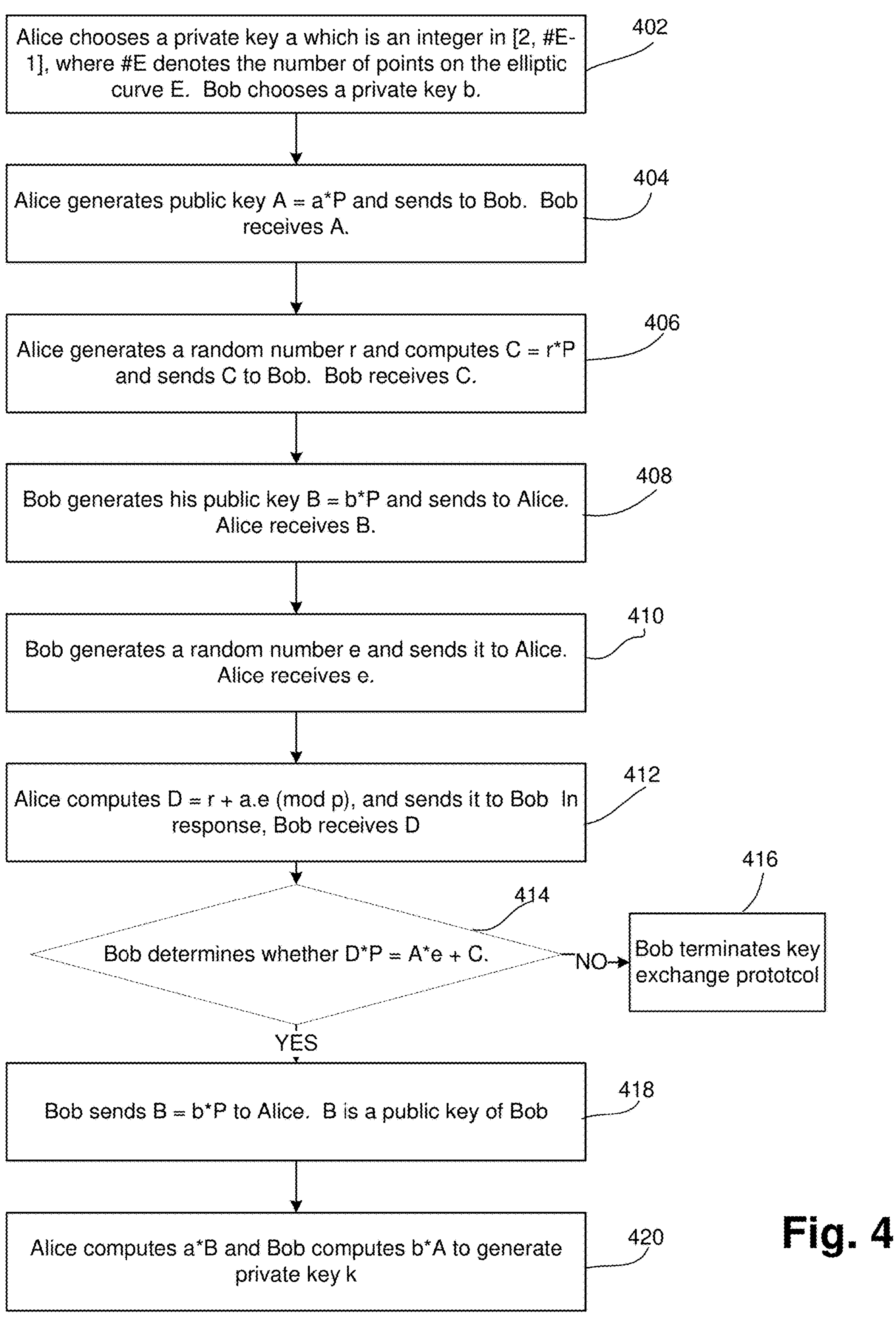
FIG. 4 is a flow diagram of the functionality of the verifiable key exchange system FIG. 1 and a client when performing ECHD in accordance to embodiments.

FIG. 4 is a flow diagram of the functionality of verifiable key exchange system 10 of FIG. 1 (referred to as "Bob") and a client 106 (referred to as "Alice") when performing ECHD in accordance to embodiments.

At 402, Alice chooses a private key a which is an integer in [2, #E-1], where #E denotes the number of points on the elliptic curve E. Similarly, Bob chooses a private key b.

At 404, Alice generates her public key A=a*P. Note that "*" is a special multiplication operator defined on the elliptic curve. Therefore, when properly generated (i.e., Alice follows the specified key exchange algorithm), A is based at least on a.

Alice sends her public key A to Bob. This means A is a point on the elliptic curve.

At 406, Alice generates a random number r and computes C=r*P. Therefore, when properly generated, C is based at least on r. Alice sends C to Bob.

At 408, Bob generates his public key B=b*P. The "*" has the same meaning as defined at 404. Bob sends his public key B to Alice. 408 can be performed in parallel to 404.

At 410, Bob generates a random number e and sends it to Alice.

At 412, Alice computes D=r+a·e (mod p), and she sends it to Bob. Note that Bob cannot recover r or a from D. "." is a scalar multiplication of two integers.

At 414, Bob verifies whether D*P=A*e+C. If they are equal, Alice's public key is trustable because if Alice does not know the private key a, it would be computationally expensive to generate a valid A. If they are not equal, Bob at 416 terminates the key exchange protocol, as it is suspected that Alice is initiating an attack.

At 418, Bob sends B=b*P to Alice. B is a public key of Bob.

At 418, Alice computes a*B and Bob computes b*A. Because a*(b*P)=b*(a*P)=(a·b)*P, they both have the same key k=(a·b)*P. "." is a scalar multiplication of two integers.

The functionality of 404-408 can be combined by Alice who need to send both A and C. Similarly, 410 can be performed by Bob before 402-408.

Example Cloud Infrastructure

FIGS. 5-8 illustrate an example cloud infrastructure that can implement system 100 that can include verifiable key exchange system 10 of FIG. 1 in accordance to embodiments.

As disclosed above, infrastructure as a service ("IaaS") is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network ("WAN"), such as the Internet, and can use the cloud provider's services to install the remaining elements of an application stack. For example, the user can log in to the IaaS platform to create virtual machines ("VM"s), install operating systems ("OS" s) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds ("VPC"s) (e.g., a potentially on-demand pool of configurable and/or shared computing resources), also known as a core network. In some examples, there may also be one or more security group rules provisioned to define how the security of the network will be set up and one or more virtual machines. Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
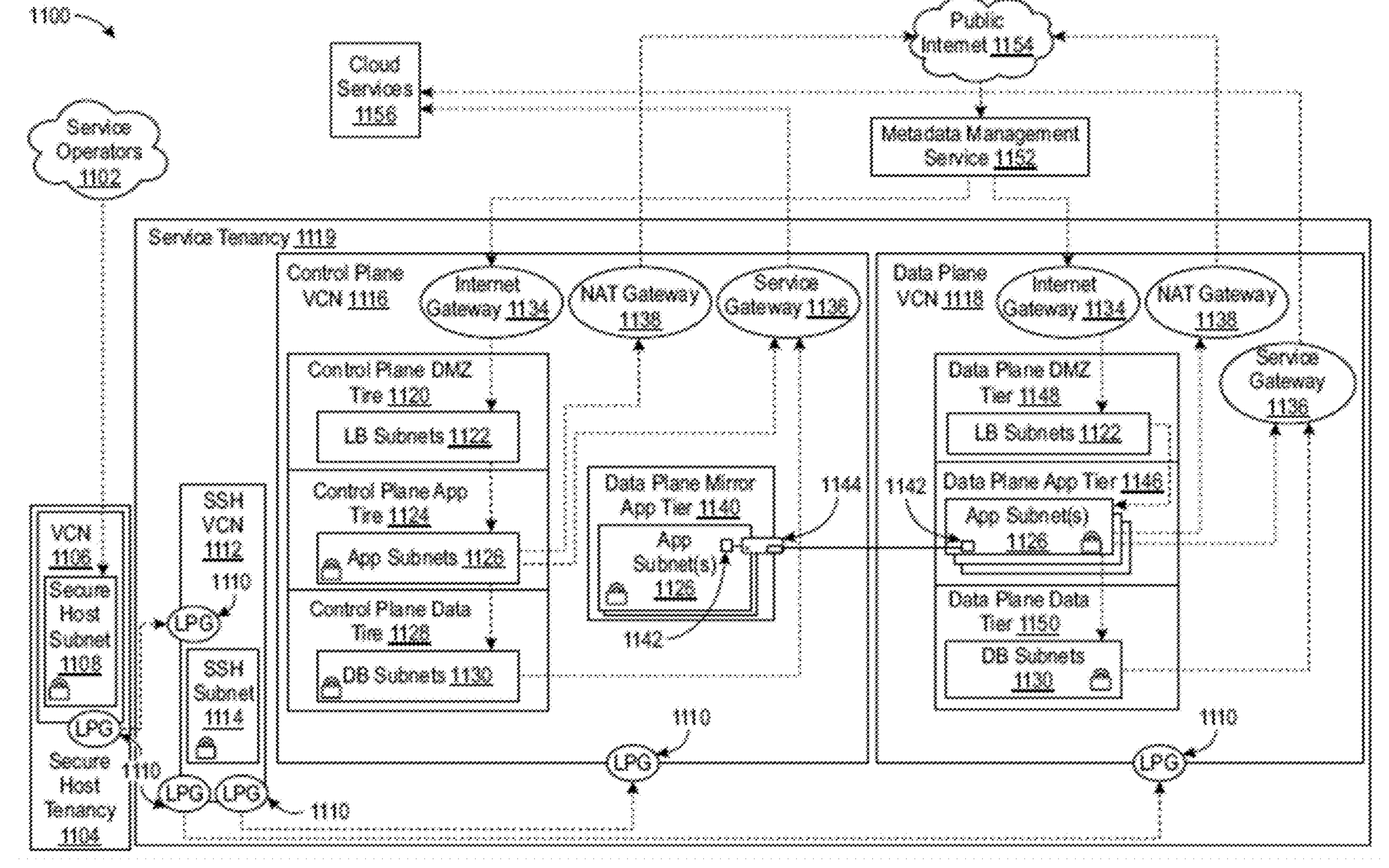
FIGS. 5-8 illustrate an example cloud infrastructure that can implement a cloud infrastructure that can include verifiable key exchange system of FIG. 1 in accordance to embodiments.

FIG. 5 is a block diagram 1100 illustrating an example pattern of an IaaS architecture, according to at least one embodiment. Service operators 1102 can be communicatively coupled to a secure host tenancy 1104 that can include a virtual cloud network ("VCN") 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant ("PDA")) or wearable devices (e.g., a Meta Quest® head mounted display), running software such as Microsoft Windows Mobile®, and/or a variety of mobile operating systems such as iOS, Windows Phone, Android, BlackBerry 8, Palm OS, and the like, and being Internet, e-mail, short message service ("SMS"), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway ("LPG") 1110 that can be communicatively coupled to a secure shell ("SSH") VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone ("DMZ") tier 1120 that acts as a perimeter network (e.g., portions of a corporate network between the corporate intranet and external networks). The DMZ-based servers may have restricted responsibilities and help keep security breaches contained. Additionally, the DMZ tier 1120 can include one or more load balancer ("LB") subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively coupled to cloud services 1156.

In some examples, the service gateway 1136 of the control plane VCN 1116 or of the data plane VCN 1118 can make application programming interface ("API") calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete ("CRUD") operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of security, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 6:
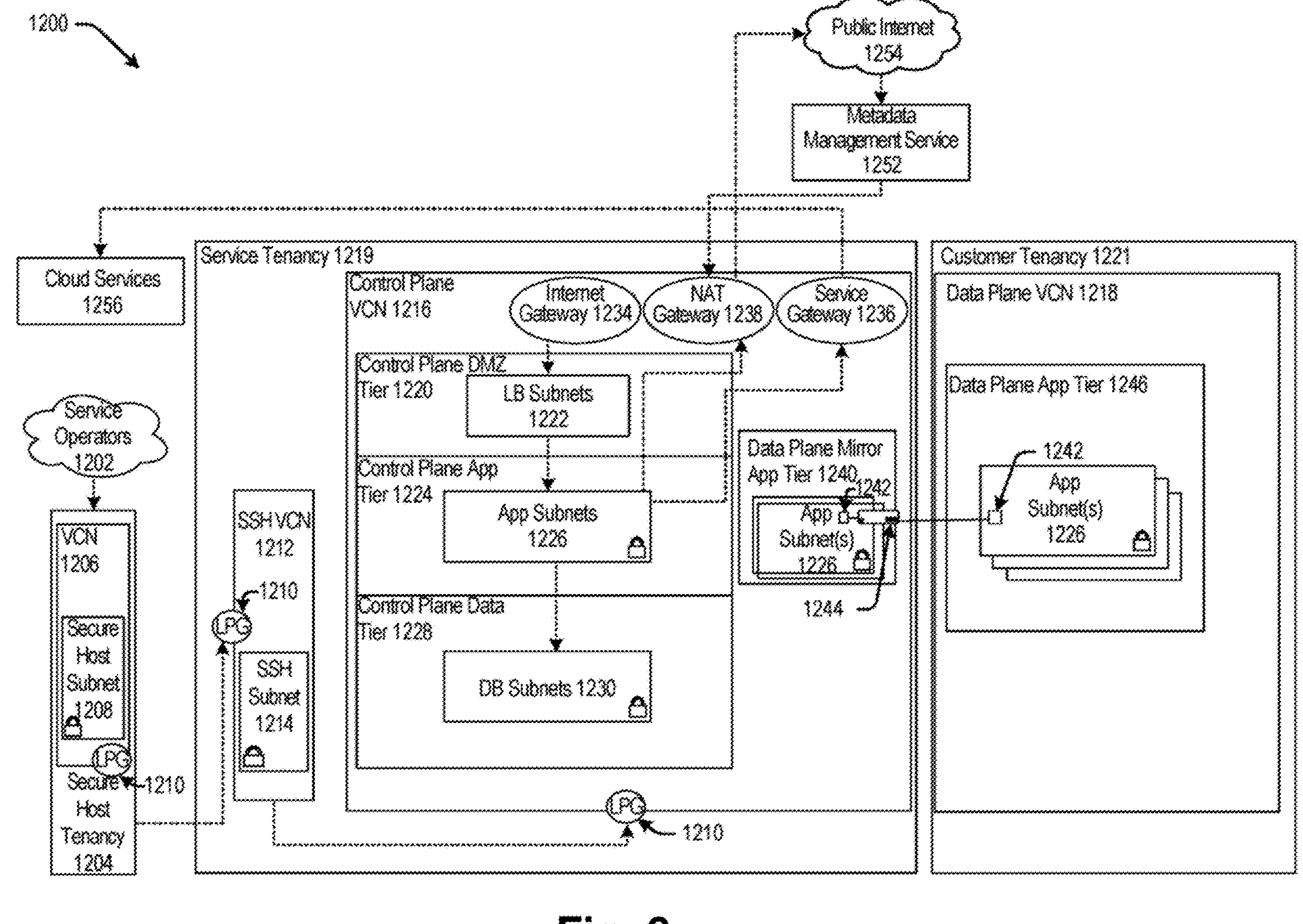

FIG. 6 is a block diagram 1200 illustrating another example pattern of an IaaS architecture, according to at least one embodiment. Service operators 1202 (e.g. service operators 1102) can be communicatively coupled to a secure host tenancy 1204 (e.g. the secure host tenancy 1104) that can include a virtual cloud network (VCN) 1206 (e.g. the VCN 1106) and a secure host subnet 1208 (e.g. the secure host subnet 1108). The VCN 1206 can include a local peering gateway (LPG) 1210 (e.g. the LPG 1110) that can be communicatively coupled to a secure shell (SSH) VCN 1212 (e.g. the SSH VCN 1112 10) via an LPG 1110 contained in the SSH VCN 1212. The SSH VCN 1212 can include an SSH subnet 1214 (e.g. the SSH subnet 1114), and the SSH VCN 1212 can be communicatively coupled to a control plane VCN 1216 (e.g. the control plane VCN 1116) via an LPG 1210 contained in the control plane VCN 1216. The control plane VCN 1216 can be contained in a service tenancy 1219 (e.g. the service tenancy 1119), and the data plane VCN 1218 (e.g. the data plane VCN 1118) can be contained in a customer tenancy 1221 that may be owned or operated by users, or customers, of the system.

The control plane VCN 1216 can include a control plane DMZ tier 1220 (e.g. the control plane DMZ tier 1120) that can include LB subnet(s) 1222 (e.g. LB subnet(s) 1122), a control plane app tier 1224 (e.g. the control plane app tier 1124) that can include app subnet(s) 1226 (e.g. app subnet(s) 1126), a control plane data tier 1228 (e.g. the control plane data tier 1128) that can include database (DB) subnet(s) 1230 (e.g. similar to DB subnet(s) 1130). The LB subnet(s) 1222 contained in the control plane DMZ tier 1220 can be communicatively coupled to the app subnet(s) 1226 contained in the control plane app tier 1224 and an Internet gateway 1234 (e.g. the Internet gateway 1134) that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238 (e.g. the NAT gateway 1138). The control plane VCN 1216 can include the service gateway 1236 and the NAT gateway 1238.

The control plane VCN 1216 can include a data plane mirror app tier 1240 (e.g. the data plane mirror app tier 1140) that can include app subnet(s) 1226. The app subnet(s) 1226 contained in the data plane mirror app tier 1240 can include a virtual network interface controller (VNIC) 1242 (e.g. the VNIC of 1142) that can execute a compute instance 1244 (e.g. similar to the compute instance 1144). The compute instance 1244 can facilitate communication between the app subnet(s) 1226 of the data plane mirror app tier 1240 and the app subnet(s) 1226 that can be contained in a data plane app tier 1246 (e.g. the data plane app tier 1146) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g. the metadata management service 1152) that can be communicatively coupled to public Internet 1254 (e.g. public Internet 1154). Public Internet 1254 can be communicatively coupled to the NAT gateway 1238 contained in the control plane VCN 1216. The service gateway 1236 contained in the control plane VCN 1216 can be communicatively couple to cloud services 1256 (e.g. cloud services 1156).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218, but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 8," may be located in Region 1 and in "Region 2." If a call to Deployment 8 is made by the service gateway 1236 contained in the control plane VCN 1216 located in Region 1, the call may be transmitted to Deployment 8 in Region 1. In this example, the control plane VCN 1216, or Deployment 8 in Region 1, may not be communicatively coupled to, or otherwise in communication with, Deployment 8 in Region 2.

Figure 7:
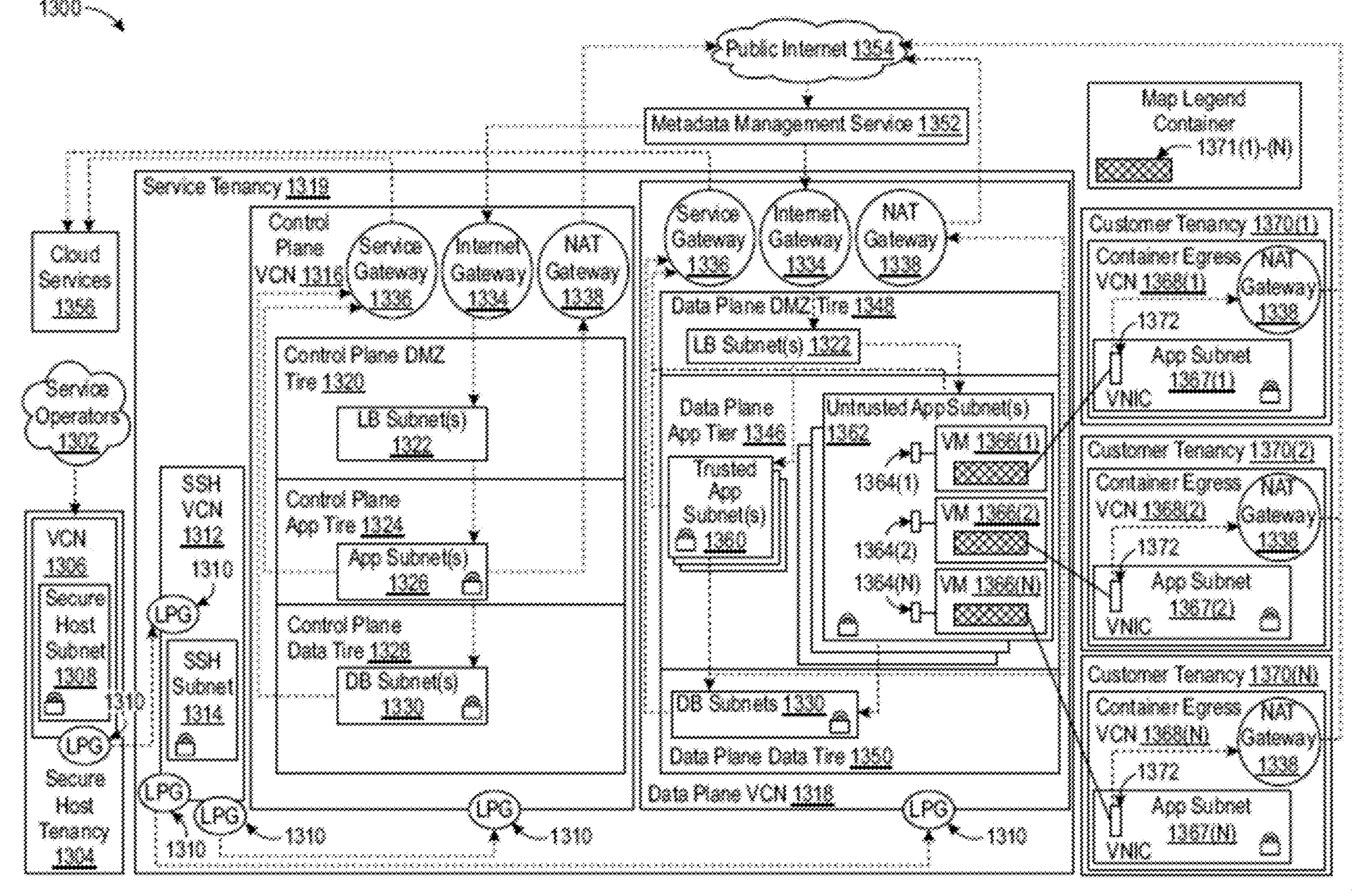

FIG. 7 is a block diagram 1300 illustrating another example pattern of an IaaS architecture, according to at least one embodiment. Service operators 1302 (e.g. service operators 1102) can be communicatively coupled to a secure host tenancy 1304 (e.g., the secure host tenancy 1104) that can include a virtual cloud network (VCN) 1306 (e.g., the VCN 1106) and a secure host subnet 1308 (e.g., the secure host subnet 1108). The VCN 1306 can include an LPG 1310 (e.g., the LPG 1110) that can be communicatively coupled to an SSH VCN 1312 (e.g., the SSH VCN 1112) via an LPG 1310 contained in the SSH VCN 1312. The SSH VCN 1312 can include an SSH subnet 1314 (e.g., the SSH subnet 1114), and the SSH VCN 1312 can be communicatively coupled to a control plane VCN 1316 (e.g., the control plane VCN 1116) via an LPG 1310 contained in the control plane VCN 1316 and to a data plane VCN 1318 (e.g., the data plane 1118) via an LPG 1310 contained in the data plane VCN 1318. The control plane VCN 1316 and the data plane VCN 1318 can be contained in a service tenancy 1319 (e.g., the service tenancy 1119).

The control plane VCN 1316 can include a control plane DMZ tier 1320 (e.g. the control plane DMZ tier 1120) that can include load balancer ("LB") subnet(s) 1322 (e.g., LB subnet(s) 1122), a control plane app tier 1324 (e.g., the control plane app tier 1124) that can include app subnet(s) 1326 (e.g., similar to app subnet(s) 1126), a control plane data tier 1328 (e.g. the control plane data tier 1128) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1134) that can be contained in the control plane VCN 1316, and the app subnet(s) 1326 can be communicatively coupled to the DB subnet(s) 1330 contained in the control plane data tier 1328 and to a service gateway 1336 (e.g., the service gateway) and a network address translation (NAT) gateway 1338 (e.g., the NAT gateway 1138). The control plane VCN 1316 can include the service gateway 1336 and the NAT gateway 1338.

The data plane VCN 1318 can include a data plane app tier 1346 (e.g. the data plane app tier 1146), a data plane DMZ tier 1348 (e.g., the data plane DMZ tier 1148), and a data plane data tier 1350 (e.g., the data plane data tier 1150 of FIG. 10). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g. public Internet 1154).

The Internet gateway 1334 contained in the control plane VCN 1316 and contained in the data plane VCN 1318 can be communicatively coupled to a metadata management service 1352 (e.g. the metadata management system 1152) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371 (1)-(N) may be communicatively coupled to the customer tenancy 1370 and may be configured to transmit or receive data from the customer tenancy 1370. The containers 1371 (1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 8:
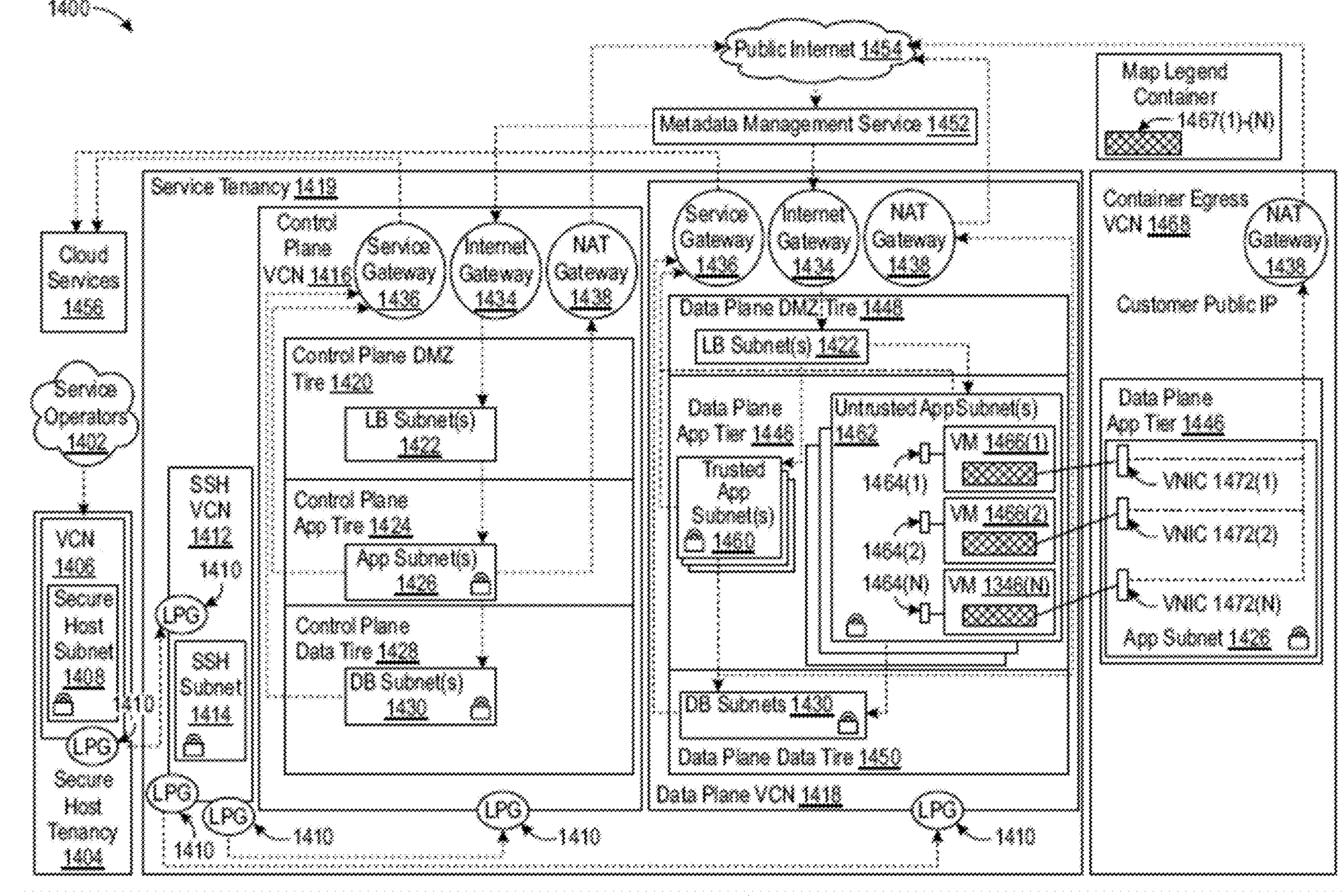

FIG. 8 is a block diagram 1400 illustrating another example pattern of an IaaS architecture, according to at least one embodiment. Service operators 1402 (e.g., service operators 1102) can be communicatively coupled to a secure host tenancy 1404 (e.g., the secure host tenancy 1104) that can include a virtual cloud network ("VCN") 1406 (e.g., the VCN 1106) and a secure host subnet 1408 (e.g., the secure host subnet 1108). The VCN 1406 can include an LPG 1410 (e.g., the LPG 1110) that can be communicatively coupled to an SSH VCN 1412 (e.g., the SSH VCN 1112) via an LPG 1410 contained in the SSH VCN 1412. The SSH VCN 1412 can include an SSH subnet 1414 (e.g., the SSH subnet 1114), and the SSH VCN 1412 can be communicatively coupled to a control plane VCN 1416 (e.g., the control plane VCN

1116) via an LPG 1410 contained in the control plane VCN 1416 and to a data plane VCN 1418 (e.g., the data plane 1118) via an LPG 1410 contained in the data plane VCN 1418. The control plane VCN 1416 and the data plane VCN 1418 can be contained in a service tenancy 1419 (e.g., the service tenancy 1119).

The control plane VCN 1416 can include a control plane DMZ tier 1420 (e.g., the control plane DMZ tier 1120) that can include LB subnet(s) 1422 (e.g., LB subnet(s) 1122), a control plane app tier 1424 (e.g., the control plane app tier 1124) that can include app subnet(s) 1426 (e.g., app subnet(s) 1126), a control plane data tier 1428 (e.g., the control plane data tier 1128) that can include DB subnet(s) 1430 (e.g., DB subnet(s) 1330). The LB subnet(s) 1422 contained in the control plane DMZ tier 1420 can be communicatively coupled to the app subnet(s) 1426 contained in the control plane app tier 1424 and to an Internet gateway 1434 (e.g., the Internet gateway 1134) that can be contained in the control plane VCN 1416, and the app subnet(s) 1426 can be communicatively coupled to the DB subnet(s) 1430 contained in the control plane data tier 1428 and to a service gateway 1436 (e.g., the service gateway of FIG. 10) and a network address translation (NAT) gateway 1438 (e.g., the NAT gateway 1138 of FIG. 10). The control plane VCN 1416 can include the service gateway 1436 and the NAT gateway 1438.

The data plane VCN 1418 can include a data plane app tier 1446 (e.g., the data plane app tier 1146), a data plane DMZ tier 1448 (e.g., the data plane DMZ tier 1148), and a data plane data tier 1450 (e.g., the data plane data tier 1150). The data plane DMZ tier 1448 can include LB subnet(s) 1422 that can be communicatively coupled to trusted app subnet(s) 1460 (e.g., trusted app subnet(s) 1360) and untrusted app subnet(s) 1462 (e.g., untrusted app subnet(s) 1362) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g., public Internet 1154).

The Internet gateway 1434 contained in the control plane VCN 1416 and contained in the data plane VCN 1418 can be communicatively coupled to a metadata management service 1452 (e.g., the metadata management system 1152) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 may be considered an exception to the pattern illustrated by the architecture of block diagram 1300 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate certain embodiments. In some other embodiments, the IaaS systems may have more or fewer components than shown in the figures, may combine two or more components, or may have a different configuration or arrangement of components.

As disclosed, one embodiment integrates the DH key exchange algorithm with zero knowledge functionality that checks whether key pairs (public and private keys) are generated properly, without revealing the private keys, to prevent DOS attacks such as the D(HE) at. Embodiments allow each communicating party to check the integrity of the public keys from the other party, before arriving at a common secret key k. Embodiments are applicable not only to the DH algorithm but also to the Elgamal encryption algorithm, as well as to the elliptic curve DH ("ECDH") algorithm, and any other algorithm that implements the DH algorithm or similar functionality for exchanging a secret key.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of establishing, at a first entity, a common secret key (k) for encrypted data communication during a key exchange between the first entity and a second entity, the method comprising:

selecting a first private key of the first entity;

receiving from the second entity a second public key (A) of the second entity, wherein the second public key, when properly generated, is based at least on a second private key of the second entity;

receiving from the second entity a first verification value (C), wherein C, when properly generated, is based at least on a second random number (r) selected by the second entity;

generating a first random number (e) and sending e to the second entity;

receiving from the second entity a second verification value (D) in response to the first random number, wherein D, when properly generated, is based at least on r, e and the second private key;

determining, based on C and D, whether A is properly generated;

when it is determined that A is properly generated, establishing the common secret key (k) based on A; and when it is determined that A is not properly generated, ending the key exchange.

2. The method of claim 1, wherein the key exchange comprises a Diffie-Hellman key exchange comprising the first private key (y) and the second private key (x), and $A=g^x$(mod p), where p is a publicly agreed to prime number and g is a generator of p.

3. The method of claim 2, wherein $C=g^r$ (mod p).

4. The method of claim 2, wherein D=r+x*e (mod p).

5. The method of claim 4, the determining, based on C and D, whether A is properly generated comprises $g^D=C\cdot A^e$ (mod p).

6. The method of claim 2, further comprising:

when A is determined to be properly generated, using $A^y$ to determine k.

7. The method of claim 1, wherein the key exchange comprises an Elgamal encryption key exchange comprising the first private key (y) and the second private key (x), and $A=g^x$ (mod p), where p is a publicly agreed to prime number and g is a generator of p.

8. The method of claim 1, wherein the key exchange comprises an Elliptic Curve Diffie-Hellman comprising the first private key (b) and the second private key (a), and A=a*P, where P and elliptical curve E, comprising $y^2=x^3+a*x+b$ (mod p), are publicly agreed to and P generates all elements of curve E.

9. A non-transitory computer readable medium having instructions stored thereon that, when executed by one or more processors on a cloud infrastructure, cause the processors to establish, at a first entity, a common secret key (k) for encrypted data communication during a key exchange between the first entity and a second entity, the establishing k comprising:

selecting a first private key of the first entity;

receiving from the second entity a second public key (A) of the second entity, wherein the second public key, when properly generated, is based at least on a second private key of the second entity;

receiving from the second entity a first verification value (C), wherein C, when properly generated, is based at least on a second random number (r) selected by the second entity;

generating a first random number (e) and sending e to the second entity;

receiving from the second entity a second verification value (D) in response to the first random number, wherein D, when properly generated, is based at least on r, e and the second private key;

determining, based on C and D, whether A is properly generated;

when it is determined that A is properly generated, establishing the common secret key (k) based on A; and when it is determined that A is not properly generated, ending the key exchange.

10. The computer readable medium of claim 9, wherein the key exchange comprises a Diffie-Hellman key exchange comprising the first private key (y) and the second private key (x), and $A=g^x$ (mod p), where p is a publicly agreed to prime number and g is a generator of p.

11. The computer readable medium of claim 10, wherein $C=g^r$ (mod p).

12. The computer readable medium of claim 10, wherein D=r+x*e (mod p).

13. The computer readable medium of claim 12, the determining, based on C and D, whether A is properly generated comprises $g^D=C\cdot A^e$ (mod p).

14. The computer readable medium of claim 10, the establishing k further comprising:

when A is determined to be properly generated, using $A^y$ to determine k.

15. The computer readable medium of claim 9, wherein the key exchange comprises an Elgamal encryption key exchange comprising the first private key (y) and the second private key (x), and $A=g^x$ (mod p), where p is a publicly agreed to prime number and g is a generator of p.

16. The computer readable medium of claim 9, wherein the key exchange comprises an Elliptic Curve Diffie-Hellman comprising the first private key (b) and the second private key (a), and A=a*P, where P and elliptical curve E, comprising $y^2=x^3+a*x+b$ (mod p), are publicly agreed to and P generates all elements of curve E.

17. A cloud based server comprising one or more processors;

a communication interface coupled to the processors, the communication interface providing encrypted data communication between the server and a client device;

the one or more processors establishing a common secret key (k) for the encrypted data communication during a key exchange between the client device, the establishing k comprising:

selecting a first private key;

receiving from the client device a second public key (A), wherein the second public key, when properly generated, is based at least on a second private key of the client device;

receiving from the client device a first verification value (C), wherein C, when properly generated, is based at least on a second random number (r) selected by the client device;

generating a first random number (e) and sending e to the client device;

receiving from the client device a second verification value (D) in response to the first random number, wherein D, when properly generated, is based at least on r, e and the second private key;

determining, based on C and D, whether A is properly generated; and when it is determined that A is properly generated, establishing the common secret key (k) based on A; and when it is determined that A is not properly generated, ending the key exchange.

18. The cloud based server of claim 17, wherein the key exchange comprises a Diffie-Hellman key exchange comprising the first private key (y) and the second private key (x), and $A=g^x \pmod p$, where p is a publicly agreed to prime number and g is a generator of p.

19. The cloud based server of claim 17, wherein the key exchange comprises an Elgamal encryption key exchange comprising the first private key (y) and the second private key (x), and $A=g^x \pmod p$, where p is a publicly agreed to prime number and g is a generator of p.

20. The cloud based server of claim 17, wherein the key exchange comprises an Elliptic Curve Diffie-Hellman comprising the first private key (b) and the second private key (a), and A=a*P, where P and elliptical curve E, comprising $y^2=x^3+a*x+b \pmod p$, are publicly agreed to and P generates all elements of curve E.

* * * * *